United States Patent [19]

Cornell

[11] Patent Number: 4,586,227

[45] Date of Patent: May 6, 1986

[54] METHOD OF MAKING A SOLAR WATER HEATER

[76] Inventor: S. Douglas Cornell, 11 E. Orange Grove Rd. #1513, Tucson, Ariz. 85704

[21] Appl. No.: 607,974

[22] Filed: May 7, 1984

[51] Int. Cl.⁴ .................. B23P 15/26; F24J 2/14; F24J 2/46; B32B 31/06

[52] U.S. Cl. .................. 29/157 R; 29/458; 29/527.3; 29/530; 29/DIG. 29; 126/437; 126/438; 126/450; 126/451; 264/1.9; 264/46.5; 264/46.6; 264/261

[58] Field of Search .................. 29/157 R, 458, 527.1, 29/527.2, 527.3, 530, DIG. 29; 126/417, 432, 437, 438, 450, 451; 264/1.9, 45.3, 46.5, 46.6, 261, 268

[56] References Cited

U.S. PATENT DOCUMENTS 3,866,285 2/1975 Clark .................. 29/157 R
3,986,491 10/1976 O'Hanlon .................. 126/438
4,011,855 3/1977 Eshelman .................. 126/447 X
4,119,583 10/1978 Filip et al. .................. 264/46.6 X
4,194,491 3/1980 Randall .................. 126/417
4,355,629 10/1982 Cornell, III .................. 126/438 X
4,507,254 3/1985 Daniels et al. .................. 264/1.9

Primary Examiner—Howard N. Goldberg
Assistant Examiner—Ronald S. Wallace
Attorney, Agent, or Firm—Gregory J. Nelson

[57] ABSTRACT

There is disclosed a method for fabricating a passive solar water heater having a heat absorber and storage tank within an insulative housing. The housing is formed in a mold as a unitary structure having an exterior shell and a curved insulative interior covered with a reflective inner surface. The tank rests in a trough in the housing and is secured by a mounting which prevents heat conduction to the environment. The shell material may be fiberglass and the insulative material may be expanded polymeric material.

3 Claims, 10 Drawing Figures

METHOD OF MAKING A SOLAR WATER HEATER

This invention relates to solar energy and more particularly relates to an improvement in passive solar water heaters of the type combining a heat absorber and storage tank which minimizes heat loss during nighttime or periods of low temperature or low solar radiation.

Increased public awareness of energy consumption along with increased energy costs has resulted in the development of new solar energy devices throughout the world. Improvements in these devices have resulted in reduced manufacturing costs, improved thermal efficiency and reduced operating costs. One area of particular interest has been the area of solar water heaters. Solar water heaters have been known for a substantial period of time and a great deal exists in the prior art relating to devices and methods for heating water or other working fluid utilizing solar radiation.

For example, Walker in U.S. Pat. No. 705,167 discloses a tank type solar water heater in which water is heated prior to its entry into the solar heating unit by passage through a firebox in a stove.

U.S. Pat. No. 3,853,114 to Gaydos, Jr. shows a solar heater in which a helix of tubing is contained within a transparent box. The box is contained within an outer transparent box and the inner box is filled with a mixture of magnetite, perlite and lampblack around the tubing. Water is circulated through the tubing.

Eshelman, U.S. Pat. No. 4,011,855 describes a device in which a glazed, insulated enclosure with reflective inner surfaces is used to house and concentrate solar heat in the tube or tubes through which fluid is passed. Bieringer et al, U.S. Pat. No. 4,091,796 describes a device in which fluid passing through a tube is secured within a larger evacuated transparent tube with a curved reflective surface suspended from the larger tube in a position to reflect the sun's rays onto the fluid tube. Decker, U.S. Pat. No. 4,271,824 shows a device in which the glazings are mounted to a collector box or casing by means of rubber gaskets which are in direct contact with the collector box or casings.

As can be seen from the above and other patents, solar water heaters are available in various configurations and arrangements to improve efficiency both operational and manufacturing.

However, for a solar water heater of the general type combining heat absorption and storage in a tank to be economically competitive, it is necessary that the number of disadvantages of such water heaters be overcome. The advantages of such solar water heaters are apparent so long as the sun is shining and radiation is impinging upon the apparatus and further providing that the demand upon the unit does not exceed its capacity. In such cases, solar water heaters are an effective and viable alternative to the use of electricity, natural gas, or fossil fuels to heat water for both domestic and commercial uses.

Some of the disadvantages of such solar water heaters become apparent during periods of low solar radiation or at nighttime. During these times, conventional solar water heaters tend to loose substantial amounts of heat, particularly when a chilling wind blows across the absorptive surface of the heater. A heated body in a less hot atmosphere or environment is subject to more rapid heat loss due to radiation (long wave heat radiation) as well as through the mechanism of heat removal by conduction through heat conductive material, such as by metal. Further, convective heat losses also occur as the air currents passing across the heated surface carry off heat with the air.

Solar water heaters which have roof mounted collectors and in some cases storage on a roof surface, operate in an environment in which the daytime temperatures may exceed 180° F. During nighttime, the temperatures may drop to 80° F. or below. Thus, in the morning before the sun has had sufficient time to add heat to the stored water, the user may find the supply of heated water inadequate due to heat losses as described above.

In an attempt to overcome this problem, the applicant's U.S. Pat. No. 4,355,629 discloses a superior performance passive solar water heater which combines a heat absorber and storage tank which is adapted to minimize heat loss due to nighttime radiation, wind and other conditions. More specifically, the patent discloses improvements which substantially reduce the water storage tank radiation by maintaining the storage tank in a substantially air-tight environment. The patent also describes a construction which interrupts the heat conduction path from the tank environment to the surrounding environment. Further, the applicant's prior patent suggests a construction for the cold water inlet tube so as to minimally disrupt the heated water in the tank.

The foregoing passive solar water heater of the applicant represents a substantial improvement in the state of the art. The present application is directed to further improvements in passive solar water heaters of the general type.

Accordingly, it is an object of the present invention to provide a passive solar water heater of the type combining heat absorber and storage in a tank and which minimizes heat losses at all times especially during times when solar water heater is not actively receiving solar heat. Further, the present invention relates to an improved method of constructing such a passive solar water heater.

Briefly, the applicant's invention is directed to improvements in solar water heaters of the type combining heat absorber and storage tank in which loss of heat to the environment during periods of low temperature or radiation is minimized. With the applicant's device, the water tank is covered on its exposed sides with a selective surface having desirable properties of absorbing substantially all of the solar radiation which strikes the tank and which coating has the additional property of minimizing reradiation. The water tank is housed in a rectangular housing which includes an outer fiberglass shell and an inner insulative lining. The inner insulative lining and the outer shell is preferably constructed in a mold arrangement having a male and female member which define the shape of the shell and insulation. A reflective material is then secured to a portion of the mold. The outer shell of fiberglass or similar material is first formed over a mold section and foam insulation is poured, sprayed or injected between the mold members to form a solid foam core having a longitudinally extending central section conforming and adapted to receive a portion of the tank. The resulting construction is a unitary housing with the outer shell, insulation and interior reflective surface. The insulative, reflective surfaces on either side of the tank are preferably curved to direct radiation towards the centrally positioned tank. Reflective surface is provided on these curved surfaces.

A lip is formed at the location when the shell ends and where the reflective surface begins. At this location a ledge is formed to support glazing. Outer and inner glazing is generally disposed in parallel relationship across the top of the housing. A flashing slot is formed in the shell to permit insertion of flashing under the frame.

Hot water is removed from the upper location in the tank to insure that hottest water is withdrawn. Cold water is introduced in a lower elevation in the tank through a longitudinally extending tube having enlarged inlet holes or slots on the underside of the inlet to permit more total aperture area with minimum weakening of the inlet tube and minimum disturbance of the tank contents.

The tank itself is mounted or secured to the housing using a mechanical fastening arrangement with a nonconductive portion to minimize conductive heat losses from the tank to the exterior of the housing.

The above and other objects and advantages of the present invention will become more readily apparent from the following description, claims and drawings in which:

Figure 1:
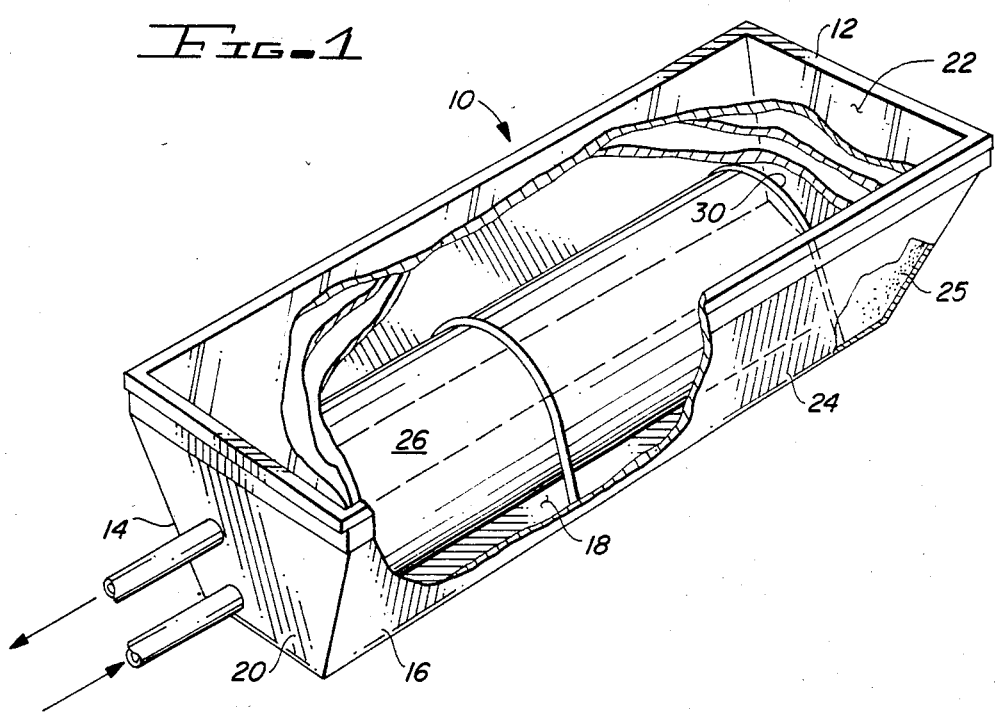
FIG. 1 is a perspective view of the solar water heater of the present invention.

Turning now to the drawings, FIG. 1 shows a perspective view of the passive solar water heater of the present invention. Throughout this application, the term "passive" refers to a solar water heater of the general type in which solar heat is collected and stored during daytime periods for use without apparatus driven by a mechanical energy. The solar device of the present invention is generally designated by the numeral 10 and includes a generally rectangular shaped insulated housing 12. Housing 12 is shown having a generally trapezoidal cross section with opposite inwardly inclined sides 14 and 16 and bottom 18. Outwardly inclined or angled ends 20 and 22 are provided at the opposite ends of the housing. The housing itself is an integral construction comprised of two components, the exterior fiberglass shell 24 and an interior insulative lining 25 as will be described in greater detail hereafter.

Water tank 26 is positioned in a central location in housing 12 extending generally longitudinally therein. Tank 26 is preferably cylindrical in configuration having opposite ends 28 and 30. Tank 10 can be constructed from a variety of suitable materials but preferably is suitably conductive material such as cast iron or steel. Tank 26 rests or "nests" in the central semi-circular trough 32 extending longitudinally and centrally aligned within the housing 12. The trough is formed as part of the insulative lining 25. The interior sides 34 and 36 of the lining positioned at opposite sides of the tank are generally arcuate or curved. Preferably, the curvature is in the general parabolic form so that solar radiation which does not impinge directly onto the surface of tank 26 but strikes the curved surfaces 34 and 36 and will be reflected towards the tank. Reflection is accomplished by means of reflective coating 38 on the exposed surfaces of curved surfaces 34 and 36 adjacent the tank. The reflective coating 38 is preferably a commercially available material such as metal foil or metalized synthetic material such as Mylar film aluminized on one or both sides to provide reflectivity.

Water tank 26 is coated with a selective coating 40 on at least the exterior portion of the tank exposed to solar radiation. The reflective surface 38 is provided on both ends of the tank and circumferentially around the tank from either opposite edges of the trough 32. The selective coating is chosen having properties which permit it to absorb a large portion of the sun's short wave radiation but inhibits long wave re-radiation which would be emitted by the heated water tank. An example of the type of selective coating utilized in the invention is the plated coating generically known as black chrome or other dark color paints which are commonly available, all surfaces characterized by high absorption and low emissivity. A variety of such coatings are known in the industry and to those skilled in the art and the invention is not restricted to the use of a particular selective surface.

Figure 2:
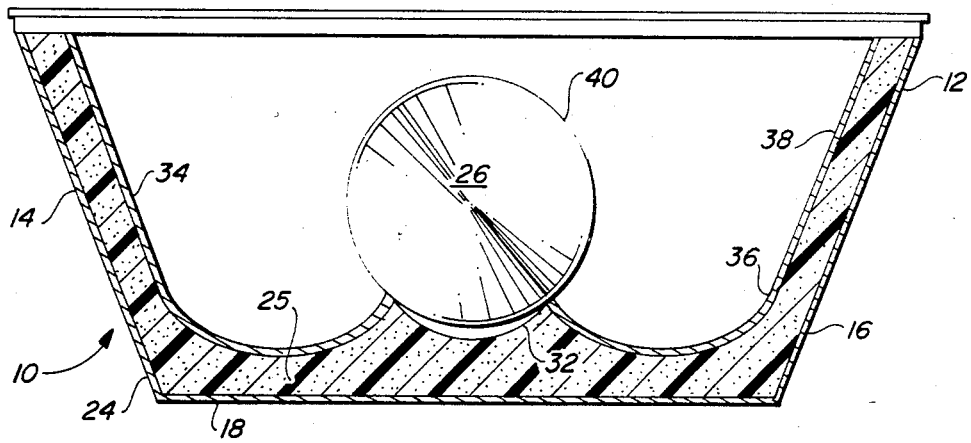
FIG. 2 is a cross-sectional view taken along lines 2—2 of FIG. 1.
Figure 6:
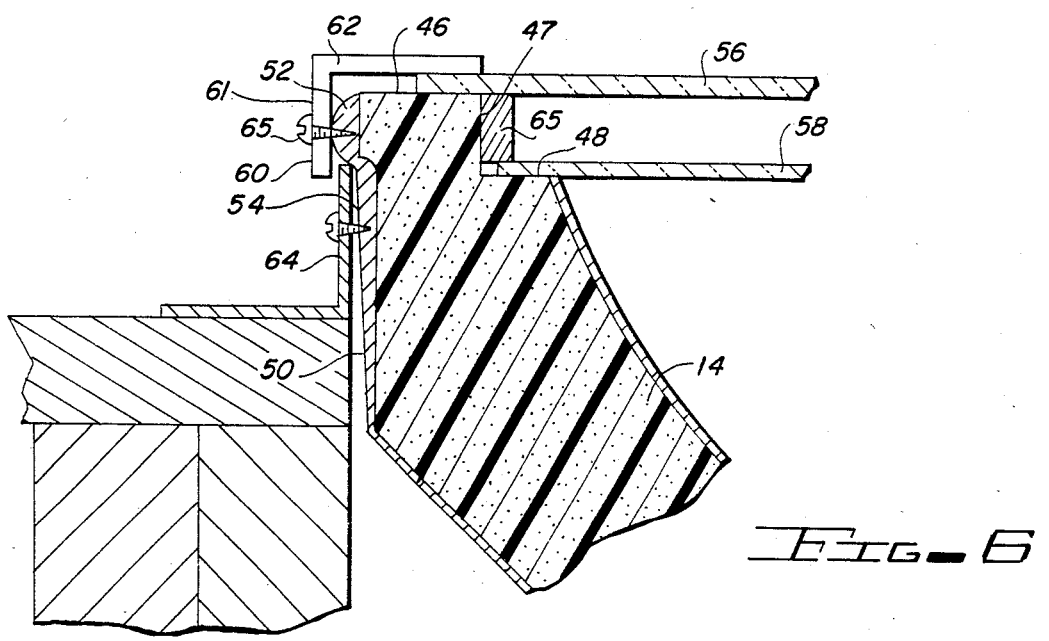
FIG. 6 is a detail view of the edge of the housing.

As best seen in FIGS. 2 and 6, the opposite upper ends of sides 14, 16 and ends 20, 22 of the housing terminate at generally horizontal ledges 46 and 48. A longitudinally extending groove 47 is provided peripherally along the inner side of the housing between ledges 46 and 48. Ledges 46 and 48 are continuous around the housing. A vertical flashing groove 50 is formed in the exterior of the shell near the upper end of sides 14, 16 and ends 20, 22. Groove 50 is undercut leaving a lip 52 at the outer peripheral edge of the housing.

As can best be seen in FIGS. 2 and 6, outer glazing 56 extends across the top of the housing having its perimeter resting on ledge 46. Interior glazing 58 extends across the housing having its perimeter resting on ledge 48 around the perimeter of the housing. Spacers 65 of nonconductive plastic extend between glazings 56 and 58 to prevent lower glazing 58 from becoming loose during transit or installation.

The glazing shown in double layered. The collector may be single or double glazed, however, double glazing is preferred in that double glazing reduces re-radiation losses and specially losses due to nighttime re-radiation along with convection and conduction losses. Triple glazing may even be utilized in some applications. An air seal is provided between the glazing and the sides and end by application of a suitable adhesive or sealant such as silicon around the perimeter of the glazing where it engages the housing. Preferably the glazing may be selected from a number of materials which allow passage of radiation and convert infrared radiation to ultraviolet to generate heat. The glazings are preferably glass, fiberglass or plastic such as acrylic or Teflon and are transparent or translucent.

An exterior frame member 60 which is formed having two legs 61, 62 joined at right angles extends about the exterior of the housing and secured by fastener 65. Frame 60 may be aluminum or other suitable material having horizontal leg member 62 overlying the upper ledge of the housing sides and ends and overlapping the perimeter of the upper glazing 56. The vertical leg section 61 of the frame extends downwardly along the edge of the housing and terminates at a location overlapping the vertical groove 50 so that a vertical slot 54 is formed about the periphery of the housing which can accept a flashing member 64 to accomodate roof mounting as shown in FIG. 6. In this way, the solar unit is effectively sealed against the entry of moisture and can be easily and efficiently mounted on a roof location with no special modifications being necessary.

As mentioned above, the outer shell 24 of the housing is formed from fiberglass and may be sprayed or otherwise applied to a mold surface to form a hard exterior shell, as will be explained. The exterior shell preferably has a typical thickness of approximately 0.03 inches. However, as shown in FIG. 6, in location where the vertical leg 61 of the angle frame 60 engages the housing and also in the area of the flashing slot 54, extra shell thickness is desirable. In this area the layer of fiberglass is increased to provide extra depth for attachment of screws or mechanical fasteners. In these areas, the frame and flashing may then be firmly secured to the housing by mechanical fasteners 65.

Figure 4:
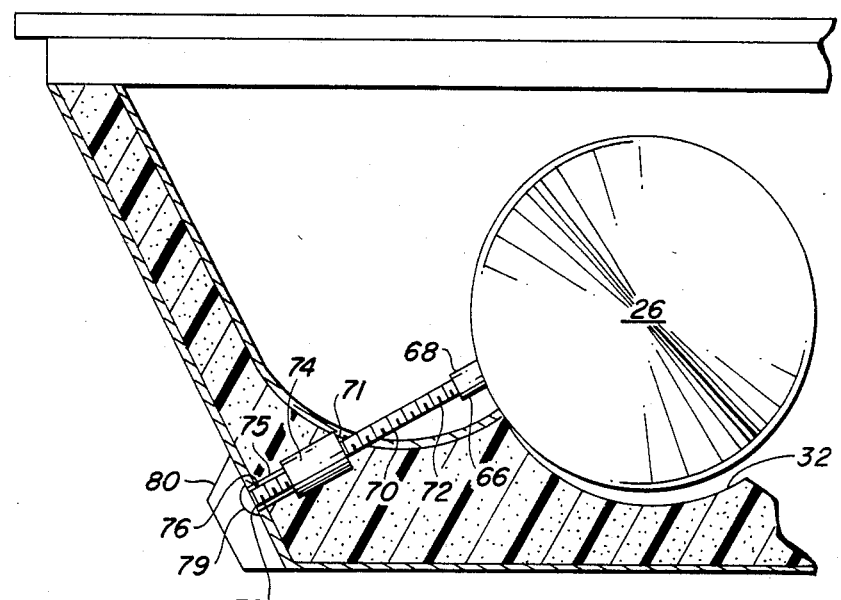
FIG. 4 is a detail view of the tank mounting.

Referring to FIG. 4, a detail view is provided showing the mounting for securing the tank 26 in place. As mentioned above, the tank rests in a longitudinal arcuate nest or trough 32 extending centrally within the housing. The mounting ties the tank down and provides a thermal barrier or break to minimize conduction of heat from the tank along the mounting bracket to the exterior of the housing. To this end, a plurality of steel couplings 66 having internal threads 68 are welded to the exterior of tank 26 at locations on either side of the tank and at an elevation above the point where the trough terminates. A steel rod 70 having threaded ends 71 and 72 has threaded ends 72 engaged in internal threads 68. Threads 71 are engaged in one end of coupling 74 positioned in bore 75 provided in the housing. Once assembled, insulative material 76 is packed in bore 75.

Coupling 74 is fabricated from nonconductive material such as a nylon, phenolic or other appropriate materials. The opposite end of coupling 74 is internally threaded and receives the threaded end at stainless steel bolt 78. The head 79 of bolt 78 secures bracket 80 to the exterior shell of the housing. In this way, the tank 26 is firmly to the exterior housing by the trough and by the mounting assembly. Heat conduction through the mounting assembly to the exterior of the unit is eliminated or minimized by the interruption of the heat path by nonconductive plastic coupling 74. Disassembly in the event of servicing may be easily accomplished.

Figure 5:
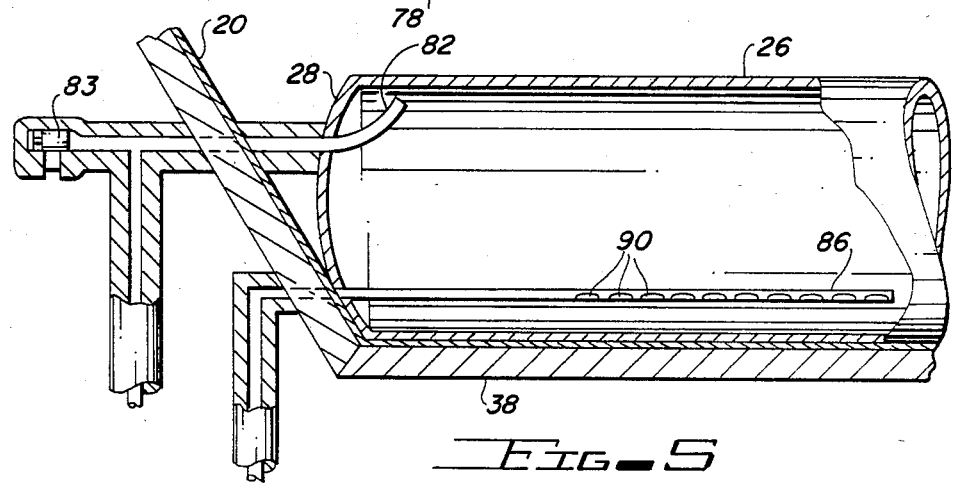
FIG. 5 is a partial longitudinal sectional view showing the tank inlet and outlet.

Referring to FIG. 5, heated water in the tank 26 is withdrawn from the tank by discharge pipe 82 which extends through tank end 28 at an upper most location in the tank. In practice, the solar heater of the invention is placed on a roof or other support generally located in an east/west direction with end 28 of the tank slightly elevated so that the outlet or discharge pipe 82 is also slightly elevated. The reason for this, in addition to the water being hot at this position, is that a tank may conveniently purged of air when it is first set up so that air will be forced out of the tank by the water and the likelihood of a sizable air bubble being trapped within the tank is minimized.

The outlet pipe 82 extends through the end wall 20 of the housing. Appropriate sealant is placed in the end around the outlet pipe. Further, the outlet pipe is appropriately insulated to minimize heat loss. The outlet pipe provides a source of heated water to a location of use. An appropriate pressure relief valve 83 may be provided in the discharge line in the event the pressure within the tank or the line exceeds a pre-determined level. The outlet pipe is connected to a use location in conventional manner.

Figure 3:
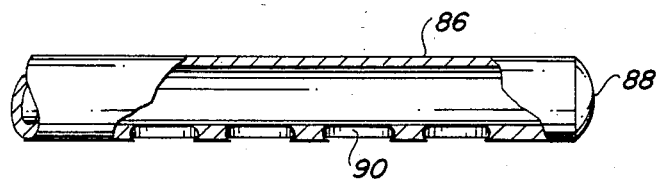
FIG. 3 is a detail view, partly broken away, of the cold water inlet tube.

Referring to FIGS. 3 and 5 the inlet tube 86 is best shown. The inlet tube extends to the tank interior and longitudinally therein at a location above the tank bottom. The inlet tube is appropriately insulated and is connected to a source of water to be heated exterior of the housing such as to the domestic water supply. The inlet tube preferably has a plurality of circular or eliptical openings 90 in the bottom half of the pipe which discharge the inlet water towards the bottom of the tank. The inlet tube is capped at 88. In this way, water is uniformly introduced along the tank and the velocity of the entering water is substantially reduced so as to leave the heated water in the tank relatively quiescent and undisturbed. Since the enlarged openings 90 are provided only in the lower half of the pipe, the structural integrity of the pipe is not significantly reduced.

Figure 9:
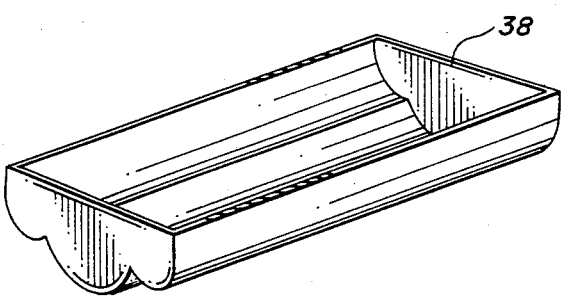
FIG. 9 is a perspective view showing the reflective housing lining prior to insertion in the mold.
Figure 8:
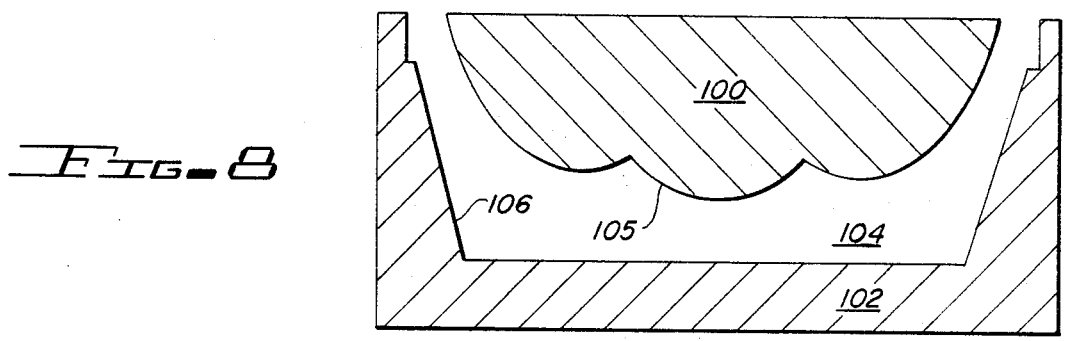
FIG. 8 is a sectional view taken along lines 8—8 of FIG. 7.
Figure 7:
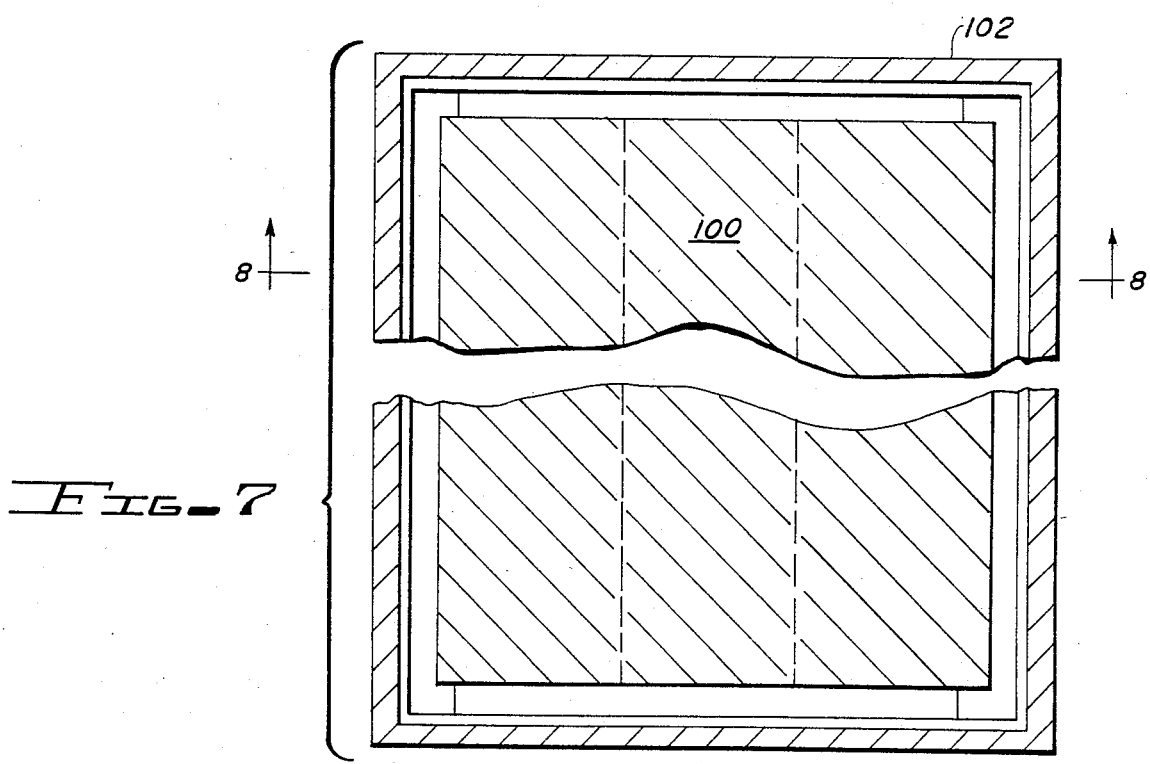
FIG. 7 is a plan view of the mold used in fabricating the unitary housing.

The construction and fabrication and assembly of the solar unit of the present invention is novel as the unitary housing can be conveniently fabricated by molding techniques. As best seen in FIGS. 8 and 9, the housing 12 can be formed from a mold having a male section 100 and female portion 102 defining an area 104 therebetween having the desired configuration of the insulation. The male mold portion 100 has a surface 105 which defines the edge sections as well as the curved reflective side portions of the housing interior and the elongate trough 32 which receives the tank. When the mold is assembled as seen in FIG. 8, foam insulation in liquid form can be poured, sprayed or otherwise injected into the mold void 104 to form a solid foam core. A particularly good material is polyisocyanurate manufactured by UpJohn Company.

The reflective interior surfaces 38 of the housing can be formed using pieces of reflective film such as the reflective Mylar film mentioned above. The pieces are cut to shape to match the ends, sides and trough as seen in FIG. 9, using a suitable template. The reflective material may be eliminated in the trough area since the trough is occupied by the tank. The reflective pieces are placed in the mold on the surface 105 and taped or otherwise temporarily secured to each other to form the reflective surface in the shape of the mold. Once the insulative liquid material is placed in the mold and allowed to set, the foam core is completed with the reflective surface as part of the foam insulative core.

Figure 10:
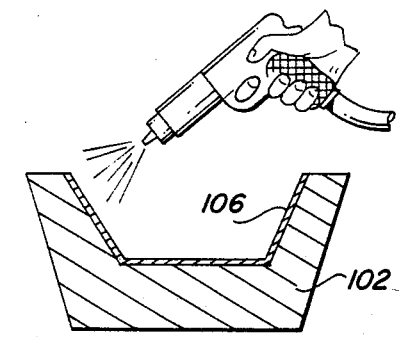
FIG. 10 diagramatically illustrates the fabrication process.

The exterior shell of the housing can be made in a similar manner using the female mold portion prior to application of the foam. The fiberglass shell preferably has sections of increased depth at locations where fasteners will be secured to the shell. After coating the mold surface with a gel coat with a UV inhibitor, fiberglass can be injected, sprayed or otherwise applied to the mold surface 106 to form the shell as seen in FIG. 10. Once the shell is completed, the mold and the shell are assembled with the male mold portion and reflective surface and the insulation is poured. The resulting structure comprises a one-piece unitary housing member with exterior shell, insulation and reflective coating.

It will be obvious to those skilled in the art to make various changes, alterations and modifications to the solar water heater and method of the present invention. To the extent those changes, alterations and modifications do not depart from the spirit and scope of the appended claims, they are intended to be encompassed therein.

I claim:

1. A method of constructing an enclosure for a passive solar heater of the type combining a heat absorber and fluid storage in a tank adapted to be exposed to solar energy, said method comprising:
   (a) providing a male mold member having a mold surface generally conforming to the interior shape of the enclosure, said mold surface defining a support trough for said fluid storage tank and further defining curved surfaces oppositely adjacent said support trough;
   (b) providing a female mold having a mold surface generally conforming to the exterior shape of the enclosure;
   (c) applying a shell material to said female mold surface with the shell having increased thickness in predetermined areas by spraying and allowing the shell material to at least partially harden;
   (d) forming a pattern of reflective material having a shape conforming at least to the curved surfaces of the male mold surface and the enclosure interior and temporarily securing same to the male mold surface;
   (e) placing the male and female molds in engagement forming a mold cavity therebetween;
   (f) filling the said mold cavity with an insulative material and allowing the insulative material to set-up; and
   (g) removing the shell, insulative material and reflective lining from the mold cavity as an integral unitary structure, leaving the mold members behind.

2. The method of claim 1 further including placing a fluid storage tank within the support trough in the integral unitary structure, said tank including selective surface coating characterized by high heat absorptivity and securing at least a single glazing across the opening of the enclosure and securing said glazing at the edge of the enclosure to make the enclosure substantially airtight.

3. The method of claim 1 wherein said shell material is fiberglass and said insulative material is an expanded polymeric material.

* * * * *